US006556820B1

United States Patent
Le et al.

(10) Patent No.: US 6,556,820 B1
(45) Date of Patent: Apr. 29, 2003

(54) MOBILITY MANAGEMENT FOR TERMINALS WITH MULTIPLE SUBSCRIPTIONS

(75) Inventors: Khiem Le, Coppell, TX (US); Heikki Lindholm, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/212,608

(22) Filed: Dec. 16, 1998

(51) Int. Cl.[7] .............................. H04Q 7/20; H04Q 7/32
(52) U.S. Cl. ...................... 455/411; 455/422; 455/461; 455/550; 340/7.21; 340/7.24
(58) Field of Search .................................. 455/403, 422, 455/461, 557, 558, 410, 411, 432, 433, 435, 550, 517, 445, 456, 458; 340/825.44, 825.47

(56) References Cited

U.S. PATENT DOCUMENTS 5,809,413 A  *  9/1998  Meche et al. ................ 455/411

(List continued on next page.)

FOREIGN PATENT DOCUMENTS

| GB | 2 308 039 A | 6/1997 |
| WO | WO 95/07009 | 3/1995 |
| WO | WO 97/07642 | 2/1997 |
| WO | WO 97/25828 | 7/1997 |
| WO | WO 98/05176 | 2/1998 |
| WO | WO 98/37721 | 8/1998 |

OTHER PUBLICATIONS

Eleftheriadis et al., *User Profile Identification in Future Mobile telecommunications Systems*, IEEE Networks: The Magazine of Computer Communications vol. 8, No. 5, Sep. 1, 1994, pp. 33–39.

Zaid, *Personal Mobility in PCS*, IEEE Personal Communications, IEEE Communications Society, vol. 1, No. 4, Oct. 1, 1994.

*Primary Examiner*—William Trost
*Assistant Examiner*—Keith Ferguson
(74) *Attorney, Agent, or Firm*—Squire, Sanders & Dempsey L.L.P.

(57) ABSTRACT

A scheme for providing mobility management for terminals with multiple subscriptions. The invention integrates Europe's Universal Mobile Telecommunications Standard (UMTS) subscriber identity module—specific procedures into single procedures, and which uses a common TMSI. An UMTS subscriber identity module is allocated for each subscription associated with a mobile terminal, wherein each UMTS subscriber identity module being identified by a identification code. A location area update is performed by providing a single location area update request message comprising a list of identification codes for each UMTS subscriber identity module associated with the mobile terminal. Each USIM is authenticated separately, and some USIMs may fail, while others may succeed authentication. The terminal and network each build their own Ordered List of Registered USIM-IDs (OLRU) which records the USIMs that succeeded. The network assigns a Base TMSI, which is similar to the current assignment of TMSIs. Subsequent Location Area Update procedures use the Base TMSI, which is common to all USIMs in the OLRU. Thus it does not have to be repeated for each USIM. Paging Request uses the Base TMSI, along with a USIM Specifier (USIMS) field, which specifies which USIM(s) is being paged. USIMS is kept very compact with bit string coding, which also gives flexibility to page multiple USIMs at the same time. The terminal and network interpret the bit string by using the OLRU. The terminal has to listen to only one paging subchannel. The paging subchannel is determined by calculating the sum modulo N of the last digits of the USIM-IDs in the OLRU. N is the number of possible subchannels. The scheme applies to UMTS as well as GSM/GPRS, if GSM/GPRS is enhanced to support multiple subscriptions per terminal.

61 Claims, 13 Drawing Sheets

U.S. PATENT DOCUMENTS

| | | | | |
|---|---|---|---|---|
| 5,956,637 A | * | 9/1999 | Ericsson et al. | 455/414 |
| 6,044,069 A | * | 3/2000 | Wan | 455/414 |
| 6,073,016 A | * | 6/2000 | Hulthen et al. | 455/435 |
| 6,085,081 A | * | 7/2000 | Leskinen | 455/435 |
| 6,104,928 A | * | 8/2000 | Waugh | 455/558 |
| 6,119,000 A | * | 9/2000 | Stephenson et al. | 455/432 |
| 6,161,012 A | * | 12/2000 | Fenton et al. | 455/432 |
| 6,185,436 B1 | * | 2/2001 | Vu | 455/558 |
| 6,212,372 B1 | * | 4/2001 | Julin | 455/418 |

* cited by examiner

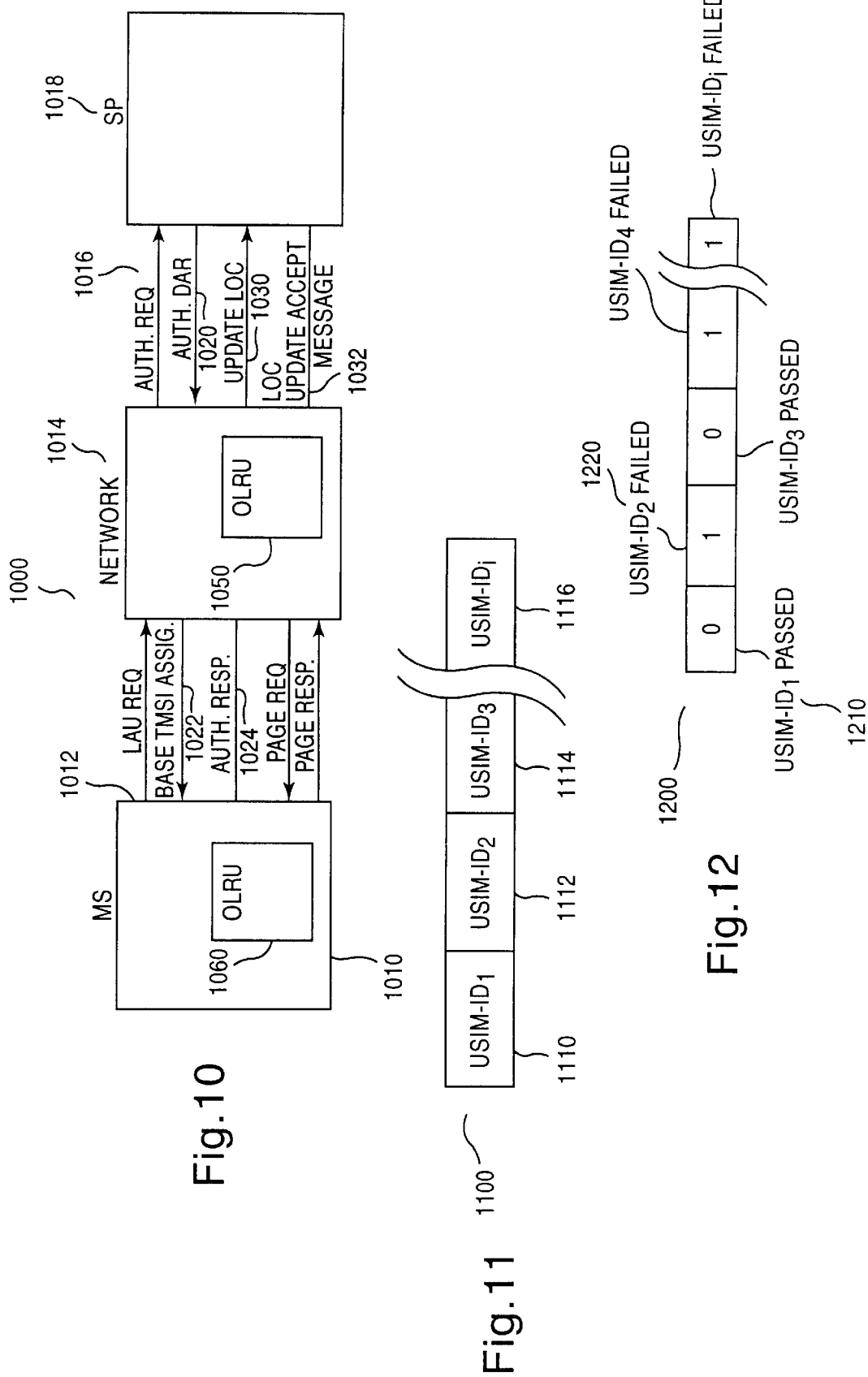

SELECTIVE LA UPDATE

MOBILITY MANAGEMENT FOR TERMINALS WITH MULTIPLE SUBSCRIPTIONS

BACKGROUND OF THE INVENTION

1. Field of the Invention

This invention relates in general to a cellular communication systems, and more particularly to mobility management for terminals with multiple subscriptions.

2. Description of Related Art

Two technical developments that have had a direct effect on the lives of millions over the past few years are the Internet and the mobile phone. While the Internet has allowed easy and inexpensive access to a wealth of information, independently of its location, the mobile phone on the other hand has broken the tie between location and access to communication.

The logical next step is to bring these two technologies together, allowing access to information that is not only independent of the source of the information, but also independent on the location of the person accessing it. Already, people are beginning to see that they need not restrict their use of mobile phones to when they are on the move. However, the mobile phone is now becoming a necessity in offices and homes alike. A mobile phone offers a single point of contact through one number, anytime, anywhere, and voice communications are not the limit. Rather, data communications capabilities are growing because they are demanded by traveling business executives. These habitual travelers must be able to access data in real time, as and when they need it.

For example, smart messaging is bringing Internet services to every mobile user's fingertips. As we become used to the freedom mobile communications provide, we will become more demanding about the information and services required to benefit our lives.

For cellular telephony to continue its spectacular growth, it must handle more subscribers per basestation and higher-bandwidth services. Toward that end, the industry's third technology generation (3G) is envisioned as a move beyond voice-only terminals to information communicators that will pass images and data.

Europe's Universal Mobile Telecommunications Standard (UMTS) is the follow-on to the second-generation Global System for Mobile communications (GSM) digital cellular standard. The Universal Mobile Telecommunications System (UMTS) is intended to provide a worldwide standard for personal mobile communications with the mass-market appeal and quality of wireline services. Over recent years, digital cellular technologies, such as GSM, have led the way towards personal communications, making mobile communications available to millions of users all around the world at reasonable cost. But to match the UMTS vision, a communications system must include support for flexible bearer and bandwidth-on-demand services for local (indoor) environments and for wide area coverage; a variety of mixed traffic types and relevant charging capability for mobile multimedia applications; customized services, service creation environments and service flexibility using, for example, intelligent network (IN) tools; and wideband wireless local loop (WLL) enhancement to the fixed network.

Nevertheless, today the mobile standards landscape is an often confusing collection of technologies. The first cellphone generation is represented in North America by the 800-MHz analog Advanced Mobile Phone Service (AMPS) system, along with IS-54 digital AMPS. Europe moved quickly past its first generation (NMT, TAC and ETACS), deploying the 2G time-division-multiplex (TDMA) GSM system at 800 MHz. In North America, 2G is now being deployed at 1.8 GHz in the form of IS-95A CDMA, IS-136 TDMA and what is essentially European GSM at a higher carrier frequency.

Some technologies are dominant in some geographical areas. Here we see the impetus for multi-mode: to combine different standards to provide ubiquity of services.

Thus, for example, a telephone for business people who travel worldwide may have to integrate GSM, DCS-1800 and PCS-1900 functionality, and perhaps also AMPS to widen the area of usability still further. And the melting-pot of new communications technologies is continually generating intriguing possibilities which are fast crystallizing into reality: handsets that combine a standard like DECT (the standard for digital European cordless telephony) for local-loop service with a wide-area technology like GSM or AMPS; DECT base stations that seamlessly integrate voice and data from multiple phone extensions within the home and transmit it as Integrated Services Digital Network (ISDN); networks for dual-mode data terminals which combine islands of high-data-rate service using DECT with wide-area coverage using GSM or another technology.

In current second generation cellular systems (GSM, IS-95/IS-41, IS136/IS-41, etc.), there is only one subscription in a mobile terminal. Each subscription is specified by a set of services and an identity. In GSM, the subscription is physically housed in a Subscriber Identity Module (SIM) card, and the subscription identity is the International Mobile Subscriber Identity (IMSI). A temporary identity (Temporary Mobile Subscriber Identity or TMSI) can also be assigned by the network, to be used in lieu of the IMSI. The existing mobility management procedures are all based on that single subscription assumption. For example, the GSM Location Area Update procedure, which is used to update the network on the terminal's location, is carried out for a given IMSI or TMSI. Another example is the paging procedure. The paging request specifies which IMSI or TMSI is being paged. The above are examples from GSM, but the single subscription assumption in mobility management is true in all second generation cellular systems.

The above mentioned UMTS has envisioned a mobile terminal with multiple subscriptions. These subscriptions may be referred to as UMTS Subscriber Identity Module (USIMs), wherein each are identified by a unique USIM-ID or identification code. Clearly, current mobility management schemes have to be extended to meet the multiple USIMs requirement. A straightforward extension would be to carry out the procedures (e.g. location area update) separately and independently for each USIM. The major drawback is that information common to USIMs is repeated (e.g. physical location of terminal), thus leading to inefficient signaling and waste of radio resources. There is also a waste of processing load on the terminal and the various network nodes. Finally, the bit space available for TMSI would be depleted faster if each USIM were assigned a different TMSI.

It can be seen that there is a need for mobility management for terminals with multiple subscriptions.

It can also be seen that there is a need for a scheme which integrates the USIM-specific procedures into single procedures, and which uses a common TMSI.

SUMMARY OF THE INVENTION

To overcome the limitations in the prior art described above, and to overcome other limitations that will become apparent upon reading and understanding the present specification, the present invention discloses a scheme for providing mobility management for terminals with multiple subscriptions.

The present invention solves the above-described problems by providing a scheme which integrates the USIM-specific procedures into single procedures, and which uses a common TMSI.

A method in accordance with the principles of the present invention includes allocating an UMTS subscriber identity module for each subscription associated with a mobile terminal, each UMTS subscriber identity module being identified by a identification code and performing a location area update by providing a single location area update request message comprising a list of identification codes for each UMTS subscriber identity module associated with the mobile terminal.

Other embodiments of a system in accordance with the principles of the invention may include alternative or optional additional aspects. One such aspect of the present invention is that the single location area update request message is provided to the network for authentication, wherein the method further comprises separately authenticating by the network each subscription represented by the identification codes.

Another aspect of the present invention is that the single location area update request message comprises USIM_IDSs listed in sequential order.

Another aspect of the present invention is that the terminal and network each build their own Ordered List of Registered USIM-IDs (OLRU) which records the USIMs that succeeded.

Another aspect of the present invention is that the network assigns a Base TMSI.

Another aspect of the present invention is that subsequent Location Area Update procedures use the Base TMSI, which is common to all USIMs in the OLRU and therefore the Base TMSI does not have to be repeated for each USIM.

Another aspect of the present invention is that paging request uses the Base TMSI, along with a USIM Specifier (USIMS) field, which specifies which USIM(s) is being paged.

Another aspect of the present invention is that USIMS is kept very compact with bit string coding, which also gives flexibility to page multiple USIMs at the same time.

Another aspect of the present invention is that the terminal and network interpret the bit string by using the OLRU.

Another aspect of the present invention is that the terminal has to listen to only one paging subchannel which is determined by calculating the sum modulo N of the last digits of the USIM-IDs in the OLRU, and wherein N is the number of possible subchannels.

Another aspect of the present invention is that the scheme applies to UMTS as well as GSM/GPRS, if GSM/GPRS is enhanced to support multiple subscriptions per terminal.

Another aspect of the present invention is that the present invention applies to IS-95/IS-41, IS-136/IS-41 systems, if they evolve to multiple subscriptions per terminal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 10 is a block diagram of a Location Area Update (LAU) according to the present invention;

FIG. 11 illustrates the relevant parameters of a single LAU REQ message according to the present invention;

FIG. 12 illustrates the relevant parameters of a Location Update Accept message;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides support for multiple subscriptions, and achieves very high efficiency of signaling procedures over the air interface. The signaling procedures also provide total flexibility to specify which subscription(s) is being referred to. The mobility management scheme has the flexibility to support multiple subscriptions in a single mobile terminal, and yet has efficient signaling over the air interface. A subscription is defined by a set of services and a subscriber identity, and each subscription can correspond to a different service provider. The signaling load is kept low by (1) defining common signaling procedures which need not be repeated for each subscription, and (2) using compact bit string coding to identity the subscriptions within the procedures. Those skilled in the art will recognize that the present invention applies to UMTS and GSM, where the subscriptions are contained in UMTS Subscriber Identity Module (USIM) and Subscriber Identity Modules (SIM) respectively. Further, the present invention applies to GSM/

GPRS (General Packet Radio Service), if GSM/GPRS is enhanced to support multiple subscriptions per terminal. However, those skilled in the art will also recognize that the invention is not meant to be limited to UMTS and GSM, but may also apply to terminals that do not have explicit SIM, e.g., IS-95/IS-41 and IS-136/IS-41 cellular systems. However, for purposes of clarity the focus of the discussion herein will be on GSM and UMTS systems.

Figure 1:
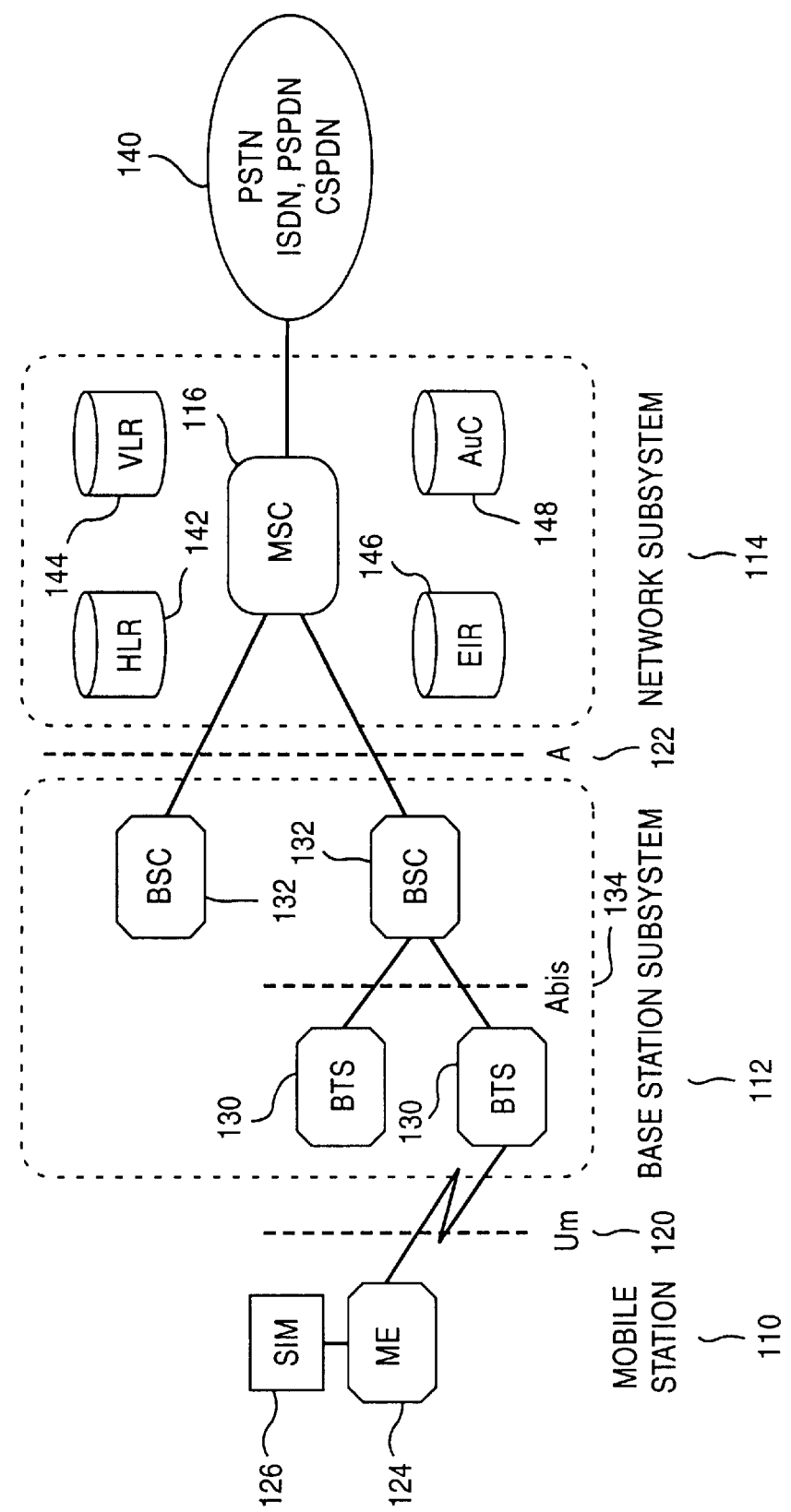
FIG. 1 illustrates shows the layout of a generic GSM network.

A GSM network is composed of several functional entities, whose functions and interfaces are specified. FIG. 1 shows the layout of a generic GSM network 100. The GSM network 100 can be divided into three broad parts. The Mobile Station 110 is carried by the subscriber. The Base Station Subsystem 112 controls the radio link with the Mobile Station. The Network Subsystem 114, the main part of which is the Mobile services Switching Center/Visitor Location Register (MSC/VLR) 116, performs the switching of calls between the mobile users 110, and between other mobile and fixed network users. The MSC/VLR 116 also handles the mobility management operations. Not shown is the Operations and Maintenance Center, which oversees the proper operation and setup of the network 114. The Mobile Station 110 and the Base Station Subsystem 112 communicate across the Um interface 120, also known as the air interface or radio link. The Base Station Subsystem communicates with the Mobile Switching Center 116 across the A interface 122.

The user's handset or Mobile Station (MS) 110 can be considered to be made of two parts. The first part includes the Mobile Equipment (ME) 124. The ME 124 provides the radio and signal processing needed to access the GSM network. The second part is the SIM (Subscriber Identity Module) 126, a smart card which carries all the subscriber specific information needed by the MS 110, e.g., subscriber identity, recent location data, messages received, service profile, etc.

Figure 2:
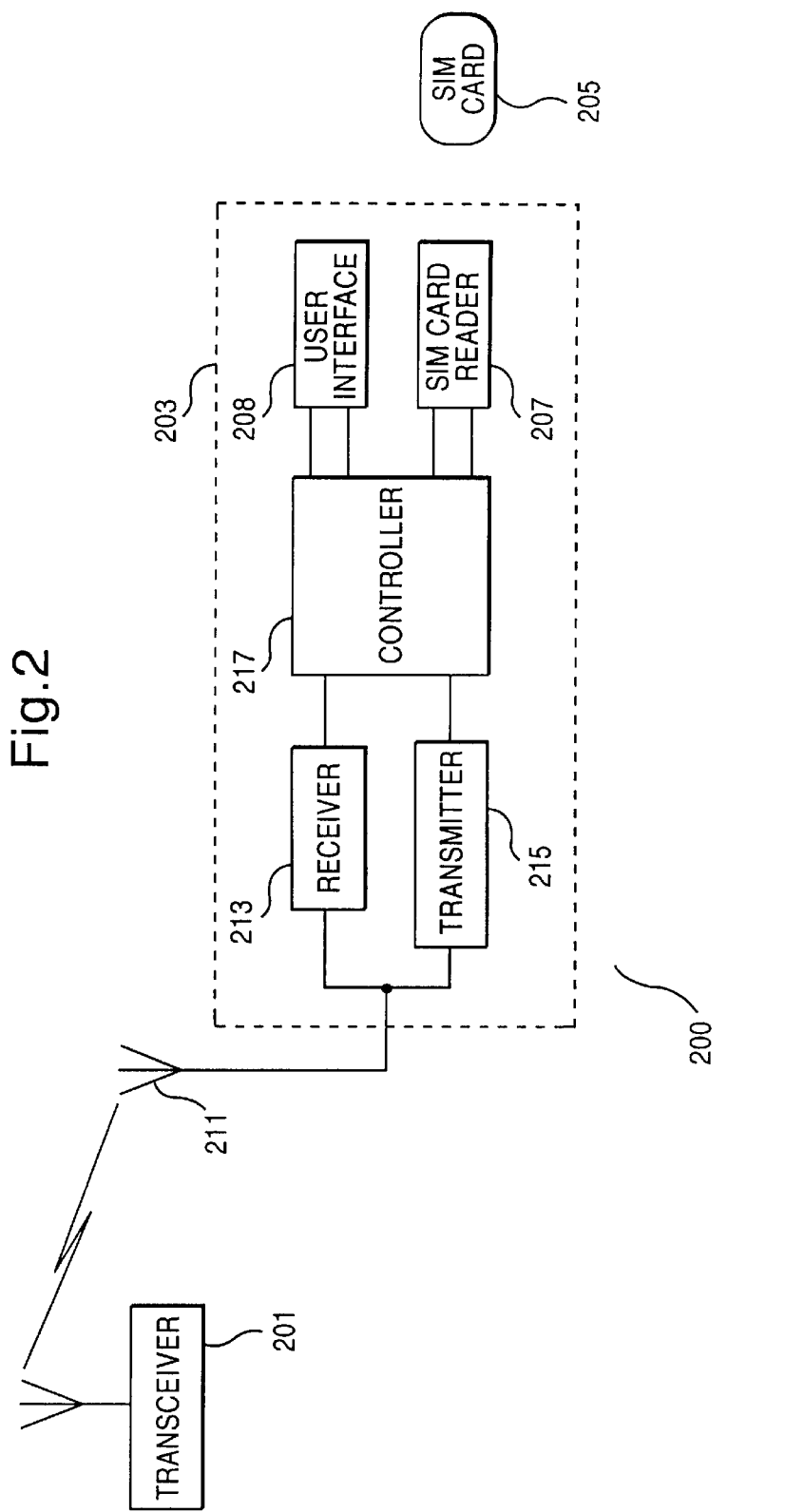
FIG. 2 is an illustration of a radio telephone circuit block diagram.

FIG. 2 is an illustration of a Mobile Equipment circuit block diagram 200. In the radio telephone system, a remote transceiver 201 sends and receives radio frequency (RF) signals to and from mobile and portable radio telephones within a fixed geographic area served by the remote transceiver 201. Radio telephone 203 is one such radio telephone served by the remote transceiver 201. A subscriber identity module (SIM) card 205 works in conjunction with the SIM card reader 207 contained within the radio telephone 203.

The SIM 205 is a complete miniature microprocessor and memory packaged in a removable card or computer chip carrier about the size of a thumbnail, containing the subscriber's identity and feature information. This includes subscriber identity codes, personal features such as short-code (speed) dialing and short messages, and a personal identity number (PIN). The PIN is used by the subscriber to restrict access to the SIM card 205 to only people who know the code. Because SIM cards 205 store the subscriber's unique information, the SIM card 205 can be used in any Mobile Equipment that accepts a SIM card 205 to place and receive calls. For example, a subscriber could use a GSM SIM card 205 in a taxicab or a rented car which has a GSM mobile radio installed.

The full-sized smart card 205 is the same size as a plastic credit card and typically slides into a slot on the bottom of the mobile equipment. The small chip carrier is usually located under the back cover of portable mobile handset telephones. Because SIM cards 205 are not radio technology specific, standards setting organizations are studying the possibility of using a SIM card 205 with cellular phones of different radio access technologies (for example, TDMA and CDMA).

The SIM card 205 has some memory which can store and retrieve information provided by the mobile telephone. This memory is sometimes used to store short messages. When messages are stored on the SIM card 205, the user can take the SIM card out of the mobile telephone and place it in an appropriate SIM card reader 207 or another mobile telephone to display the messages at a later time.

The use of the SIM 205 in the GSM system means that the term mobility takes on a new dimension. First generation Analog systems allowed Terminal Mobility, which meant that each handset/terminal had a unique terminal identifier (TID), independent of the point of attachment to the network. The subscriber was identified according to the terminal used, and billing made accordingly. With SIM 205, personal mobility becomes possible, where each user can make/receive calls independent of the point of attachment to the network as well as of a particular terminal. This implies that the services to which a user has subscribed (stored in that user's service profile) are available to him even if he moves or changes terminal equipment.

The ME 203 is uniquely identified by the International Mobile Equipment Identity (IMEI). The SIM card 205 contains the International Mobile Subscriber Identity (IMSI) used to identify the subscriber to the system, a secret key for authentication, and other information. The IMEI and the IMSI are independent, thereby allowing personal mobility. The SIM card 205 may be protected against unauthorized use by a password or personal identity number.

Referring again to FIG. 1, the Base Station Subsystem 112 is composed of two parts, the Base Transceiver Station (BTS) 130 and the Base Station Controller (BSC) 132. These communicate across the standardized Abis interface 134, allowing (as in the rest of the system) operation between components made by different suppliers.

The Base Transceiver Station 130 houses the radio transceivers that define a cell and handles the radio-link protocols with the Mobile Station 110. In a large urban area, there will potentially be a large number of BTSs 130 deployed, thus the requirements for a BTS 130 are raggedness, reliability, portability, and minimum cost. The Base Station Controller 132 manages the radio resources for one or more BTSs 130. The BSC 132 handles radio-channel setup, frequency hopping, and handovers, as described below. The BSC 132 is the connection between the mobile station 110 and the Mobile service Switching Center (MSC) 116.

The central component of the Network Subsystem 114 is the Mobile Switching Center (MSC) 116. The MSC 116 acts like a normal switching node of the Public Switch Telephone Network (PSTN) or ISDN, and additionally provides all the functionality needed to handle a mobile subscriber, such as registration, authentication, location updating, handovers, and call routing to a roaming subscriber. These services are provided in conduction with several functional entities, which together form the Network Subsystem 114. The MSC 116 provides the connection to the fixed networks (such as the PSTN or ISDN) 140. Signaling between functional entities in the Network Subsystem 114 uses Signaling System Number 7 (SS7), used for trunk signaling in ISDN and widely used in current public networks.

The Home Location Register (HLR) 142 and Visitor Location Register (VLR) 144, together with the MSC 116, provide the call-routing and roaming capabilities of GSM. The HLR 142 contains all the administrative information of each subscriber registered in the corresponding GSM network, along with the current location of the mobile station 110. The location of the mobile station 110 is typically in the form of the signaling address of the VLR 144 associated with the mobile station 110. There is logically one HLR 142 per GSM network, although it may be implemented as a distributed database.

The Visitor Location Register (VLR) 144 contains selected administrative information from the HLR 142, necessary for call control and provision of the subscribed services, for each mobile station 110 currently located in the geographical area controlled by the VLR 144. Although each functional entity can be implemented as an independent unit, manufacturers of switching equipment generally implement the VLR 144 together with the MSC 116, so that the geographical area controlled by the MSC 116 corresponds to that controlled by the VLR 144, thus simplifying the signaling required. The MSC 116 contains no information about particular mobile stations since this information is stored in the location registers.

The other two registers are used for authentication and security purposes. The Equipment Identity Register (EIR) 146 is a database that contains a list of all valid mobile equipment on the network, where each mobile station is identified by its International Mobile Equipment Identity (IMEI). An IMEI is marked as invalid if it has been reported stolen or is not type approved. The Authentication Center (AuC) 148 is a protected database that stores a copy of the secret key stored in each subscriber's SIM card 126, which is used for authentication and encryption over the radio channel.

Figure 3:
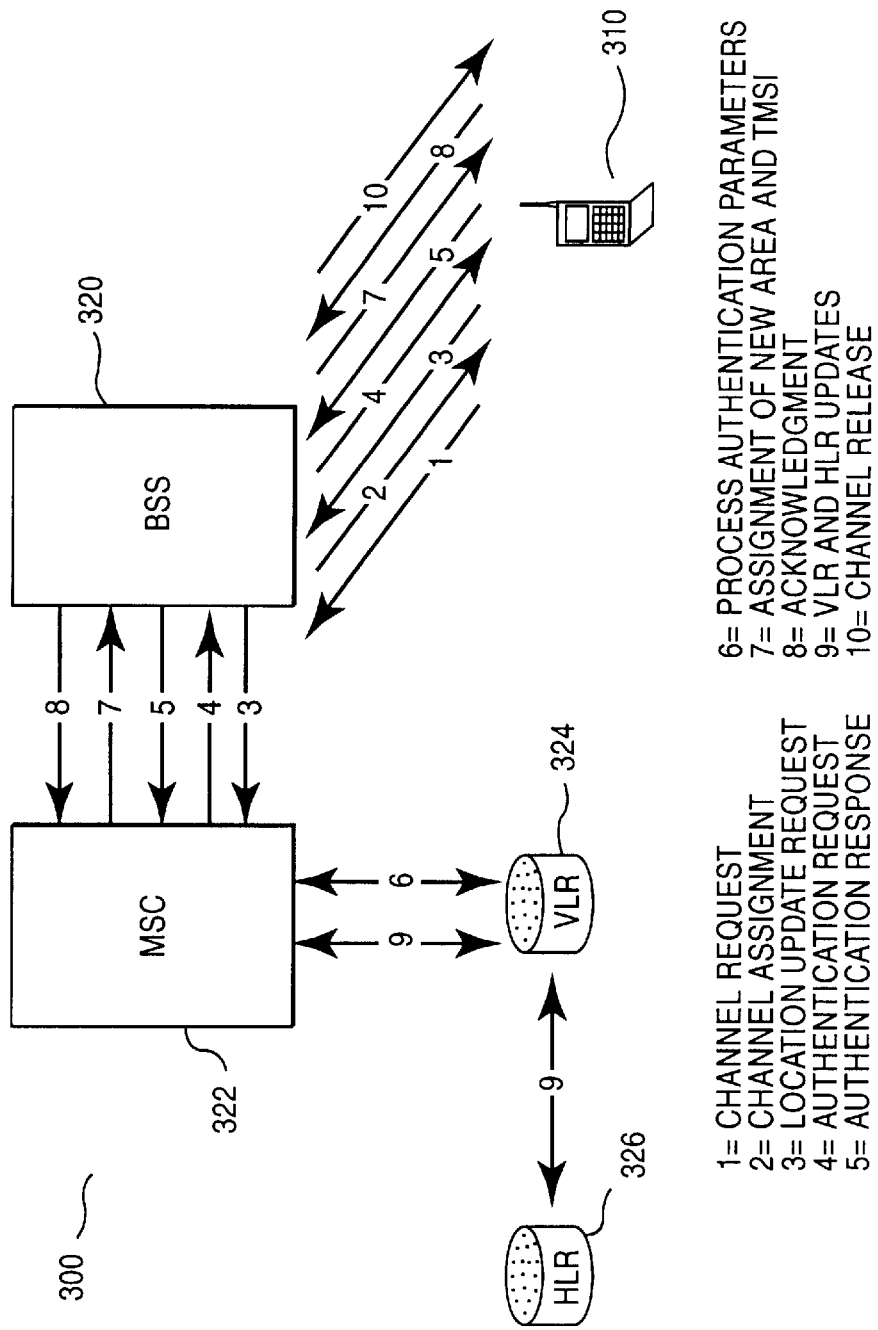
FIG. 3 shows how a mobile unit registers itself with the network.

FIG. 3 shows how a mobile unit registers itself with the network 300. After the unit 310 is turned on, it scans the GSM frequency bands and locks onto a forward (base) channel. At this time the mobile unit 310 knows if it is in a different area than it was when the unit 310 was last used. If the area is different, a registration takes places with the exchange of the messages shown in FIG. 3.

In events 1 and 2, the mobile unit 310 requests and is granted a channel by the BSS 320. Although not shown in this figure, the BTS sends a signal to the BSC as part of this process (in FIG. 3, these two systems are combined into the BSS 320). In event 3, the mobile unit requests a location update, which must be passed to the MSC 322. Before any other operations take place, the subscriber must be authenticated, which occurs in events 4, 5, and 6.

Assuming the authentication is verified, the mobile station 310 is assigned to a new area and is given a temporary mobile subscriber identity (TMSI), which is used during the operation to identify the subscriber. These actions are shown in FIG. 3 as events 7 and 8. The MSC 322 is responsible for coordinating the updating of the VLR 324 and HLR 326 (event 9), after which, the control channel is released.

Figure 4:
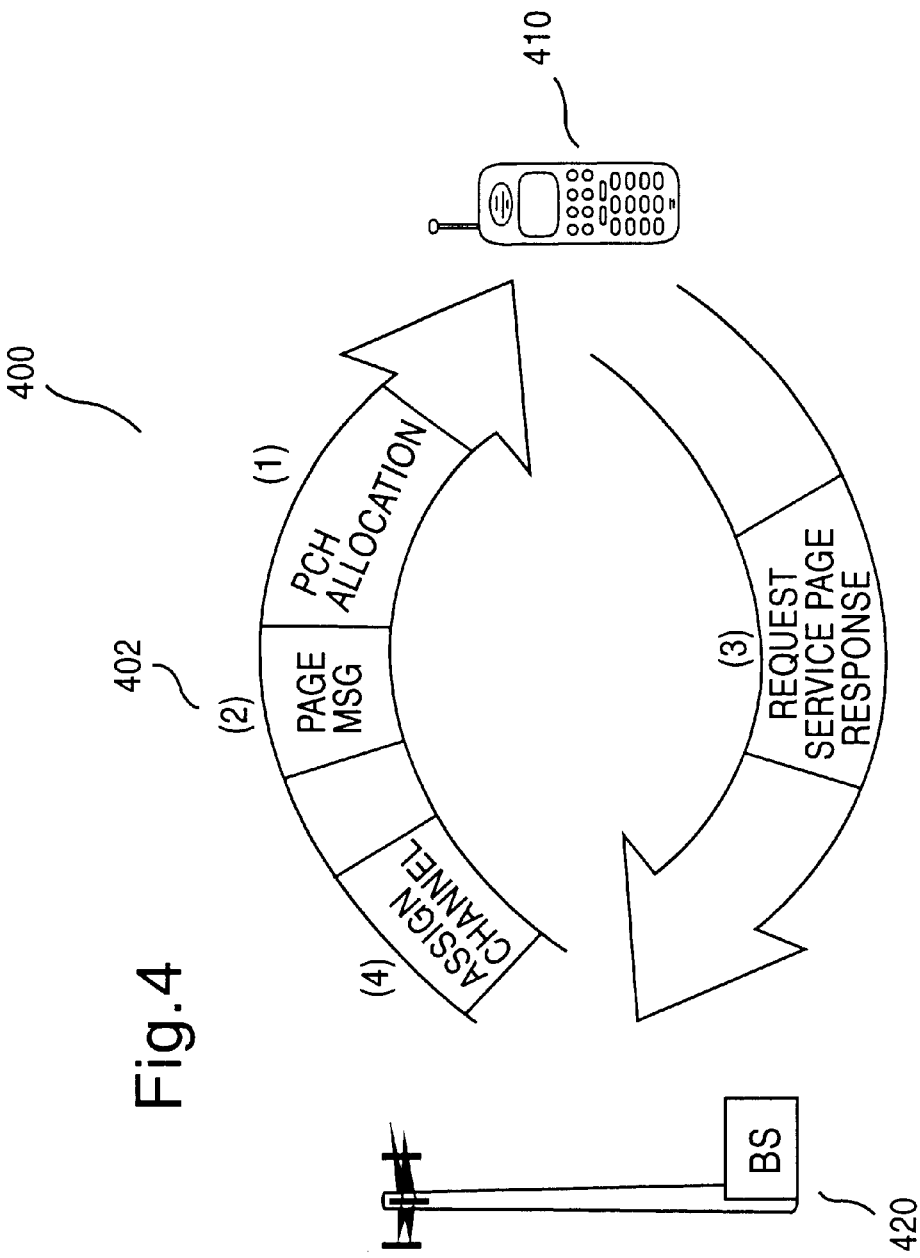
FIG. 4 illustrates the paging process.

FIG. 4 illustrates the paging process 400. Paging is the process of sending a page message 402 to the mobile telephone 410 to indicate that a call is to be received. Page messages are sent by Base Station (BS) 420 on the paging and access grant channel. To increase the number of paging messages that a control channel can deliver (and also to preserve the privacy of the subscribers), a mobile telephone 410 is assigned a temporary mobile subscriber identity (TMSI) when it registers in a system. The TMSI is shorter than the International Mobile Subscriber Identity (IMSI), which uniquely identifies the subscriber. If a mobile telephone 410 has not been assigned a TMSI, the IMSI can be sent on the paging channel.

Figure 5:
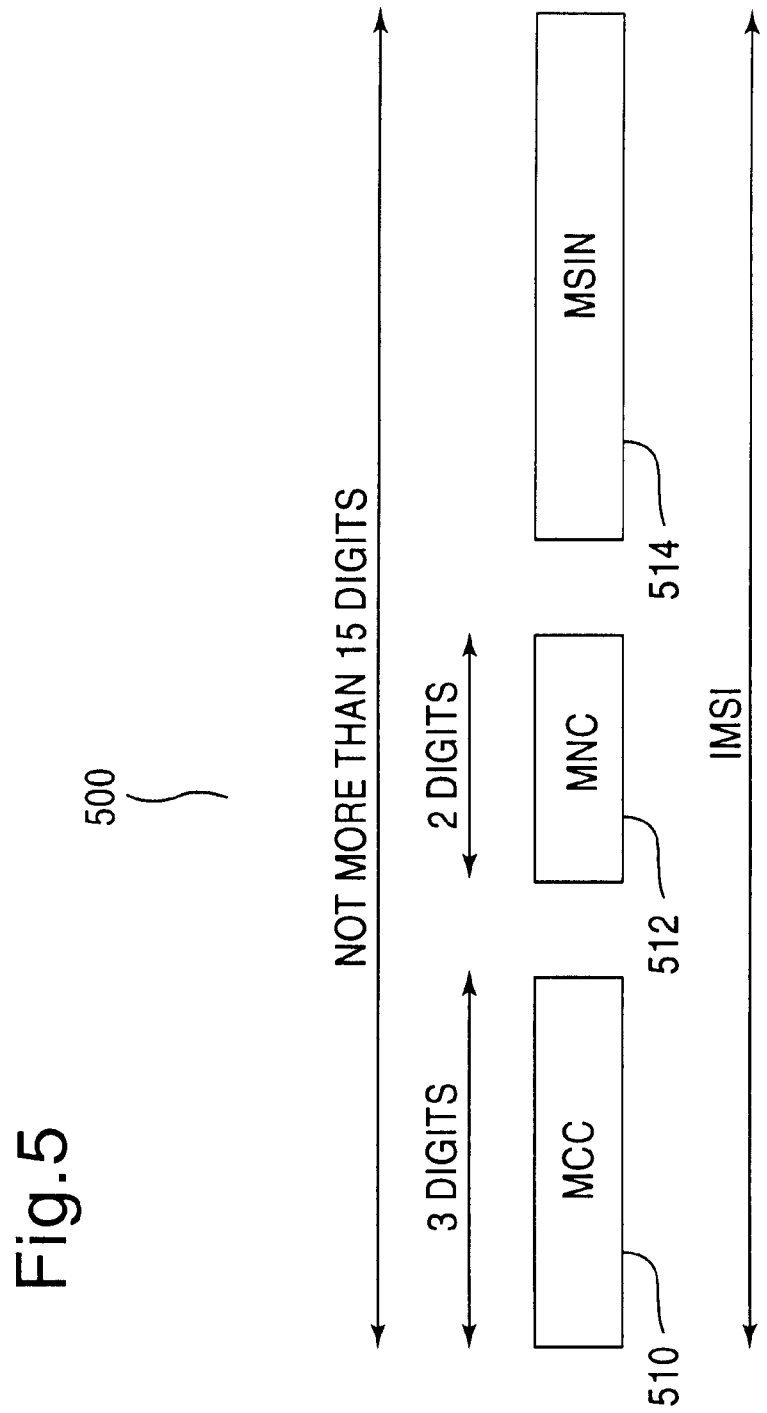
FIG. 5 shows the structure of the international mobile subscriber identity (IMSI)

FIG. 5 shows the structure of the international mobile subscriber identity (IMSI) 500. The IMSI is a unique number allocated to each mobile subscriber in the GSM system. It identifies each individual mobile subscriber uniquely, on an international basis. This number resides in the SIM and is thus transportable across mobile station equipment. It identifies the subscriber and the subscription which that subscriber has with the network. IMSI is used for internal purposes within the GSM network, such as accessing, identifying, and billing. As can be seen, the IMSI plays a critical role in GSM networks and there are elaborate procedures to ensure that it cannot be duplicated or used fraudulently.

IMSI is composed of three parts: (1) the mobile country code (MCC) 510 consisting of three digits, (2) the mobile network code (MNC) 512 consisting of two digits, and (3) the mobile subscriber identification number (MSIN) 514. The MCC 510 uniquely identifies the home country of the mobile subscriber. MCC 510 is of fixed length (i.e., 3 digits). The MCC is administered by CCITT. The MNC 512 uniquely identifies the network within the country. This means that the MNC 512 does not have any geographical significance. The MSIN 514 identifies the subscriber within the particular network.

To ensure that subscribers do not transmit IMSI numbers 500 in the clear where they can be intercepted, GSM provides for use of analias over-the-air interface for IMSI 500 (i.e., TMSI). The TMSI has only local significance (i.e., within the areas controlled by a VLR). Whenever a mobile station has a TMSI available it uses it in place of IMSI 500 to communicate to the network. TMSIs are allocated from a pool of numbers earmarked for that purpose and new mobiles are given the next available number. This scheme effectively separates the identity of the user from the number being used. Since the number varies over time and has only local significance (i.e., it is valid only so long as the subscriber is parked at that VLR), it is not of much use if intercepted.

The primary difference between wireless and wire-line networks is the issue of mobility and hence that of determining the current location of the subscriber. There are two ways in which this can be achieved. In the simplest non-location scheme the network does not attempt to keep track of the mobile and has no foreknowledge of where the subscriber is currently located. Whenever an incoming call is placed for the subscriber the network does a network-wide page for the user as described with reference to FIG. 4 above. When the user responds to the page the network determines the location and connects the call. However, this scheme is not practical for large networks that supports national and international roaming. Another way of termination calls would be for the network to have some foreknowledge of the location of the user and when a call comes in, page only in that location instead of a network-wide page. This introduces the concept of location areas.

Location areas at the simplest level could consist of a single cell. Whenever a subscriber enters a new cell the network is informed of the new location area. This scheme lays undue burden on the network since a lot of signaling is involved in a location update and it is very expensive to do it for every cell change for every subscriber. The compromise is to define a location area as an aggregate of cells. Each cell transmits the identity of the location area it is a part of to the mobile. Whenever the mobile realizes that the location areas have changed as a result of a change in cells, it sends in a location area update to the network. This is the scheme which is used in GSM. Location area have to be very carefully engineered since they are a product of two conflicting requirements, that of reducing the paging traffic and that of reducing the location update traffic. If the location areas are very large, then the paging traffic will be very heavy and if they are very small then the location update traffic is high.

Figure 6:
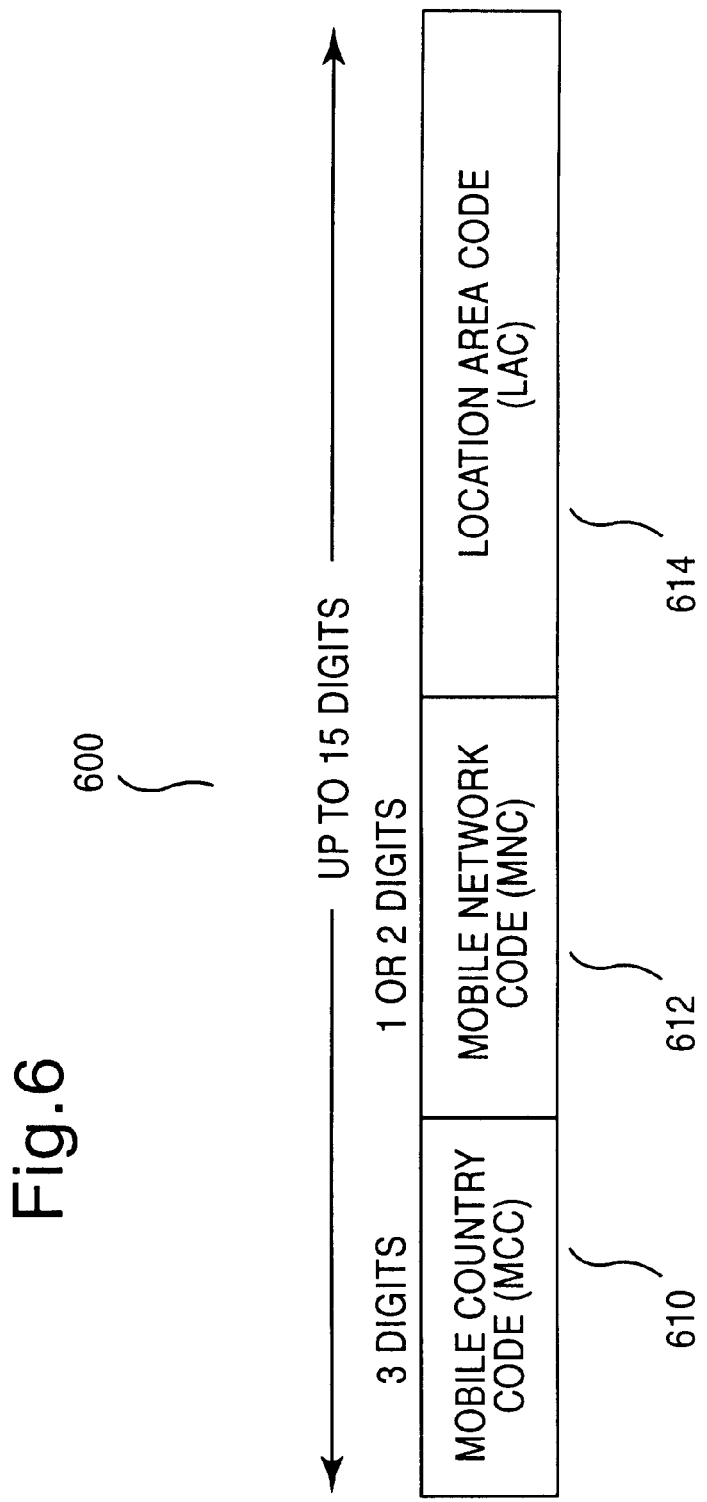
FIG. 6 illustrates the format of the LAI.

In GSM the mobile can initiate a location update either on its own or on command from the network (periodic location update). The location areas are identified by a location area identification (LAI). FIG. 6 illustrates the format of the LAI 600. The LAI 600 is similar in content to the IMSI, except that the LAI 600 identifies a cell or a group of cells. The LAI 600 plays a role in handoff operations. When a mobile station roams into another cell, if it is in the same LAI 600, no information is exchanged with any external network. Each cell within a location area has its own identity known as cell identity (CI). Thus, an LAI 600 and a CI uniquely identify each cell in the network. LAI's structure is similar to that of IMSI in that it has an MCC 610, MNC 612, and LAC (locations are code) 614. The MCC 610 and MNC 612 have the same significance as that of the IMSI. The LAC 614 is a fixed length code that identifies a location area within the GSM network.

Figure 7:
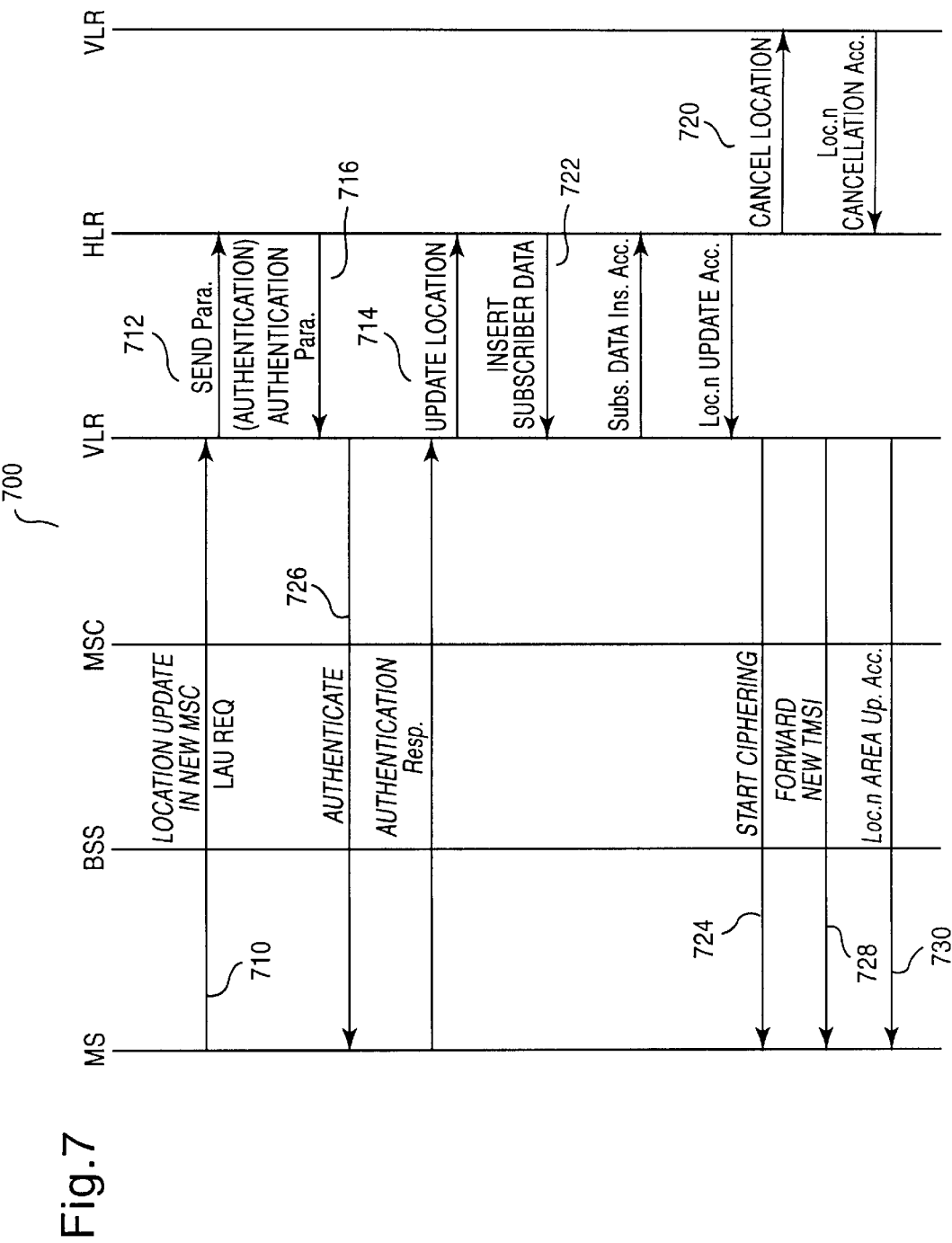
FIG. 7 shows the location update call flow.

FIG. 7 shows the location update call flow 700. At this time there are several possibilities that can occur. If the location area at which the mobile station is currently parked is controlled by the VLR which receives this message (currently VLR), then that means the VLR has already gotten all the information it needs about the subscriber and it can proceed with completing the location update procedure 700.

Another scenario occurs if the VLR has no prior record of this subscriber. When the mobile powers up a location request 710 is sent to the VLR. In this case the current VLR has to request the subscriber information from the subscriber's HLR 712. The VLR then sends a MAP-location update message to the HLR 714. This message has the mobile identity, along with the VLR address which enables the HLR to query the VLR in case of mobile terminated calls. The HLR looks up the subscriber's subscription in its internal database records and determines if the subscriber should be provided service in the current VLR. This decision is made depending on the subscriber's subscription. If the subscriber is entitled service in the VLR area, then the HLR returns a successful result to the current VLR 716. Of the subscriber is not entitled service it returns a failure result. But the HLR is not done yet. If a snapshot of the network database was taken at this moment, the mobile station is registered in the current VLR since the HLR has returned a successful result, there is information in the HLR about the current VLR address, and the mobile station is registered in the previous VLR where a successful location update was done prior to the current location update.

However, the network has to erase the record in the previous VLR to have consistent data throughout the network. To achieve this the HLR sends a cancel location message 720 to the previous VLR, which cancels the subscriber record in that VLR. The HLR then sends the subscriber data to the current VLR via an insert-subscriber data message 722 that provides all the necessary information to the VLR providing service to the subscriber.

The VLR then initiates the ciphering procedure 724. It informs the MSC, which in turn sends a message to the BSC along with ciphering key to be used. The BSC informs the mobile station via the BTS to start encrypting all future transmissions. Prior to that, the BTS is also informed to expect encrypted messages and is given the key so that it can decipher the messages. The BTS decrypts the messages and sends them to the BSC. An indication is sent to the VLR that the ciphering procedure has been initiated and that all future communications will be encrypted.

The VLR then sends a successful result to the mobile station's location update request 726. It still has one more piece of unfinished business to take care of—the mobile's TMSI. Remember that the TMSI used for initial communication was from the previous location update request. Since the location area has changed, a new TMSI has to be assigned to the mobile station 728. This new TMSI is assigned by the VLR and piggybacked on the successful location update indication to the mobile station 730. The mobile station, on receipt of the TMSI, overwrites the previous value and stores it in the SIM. This value will be used on all subsequent location updates. This location updating procedure applies for all types of location updates, whether normal location updates or periodic updates.

Figure 8:
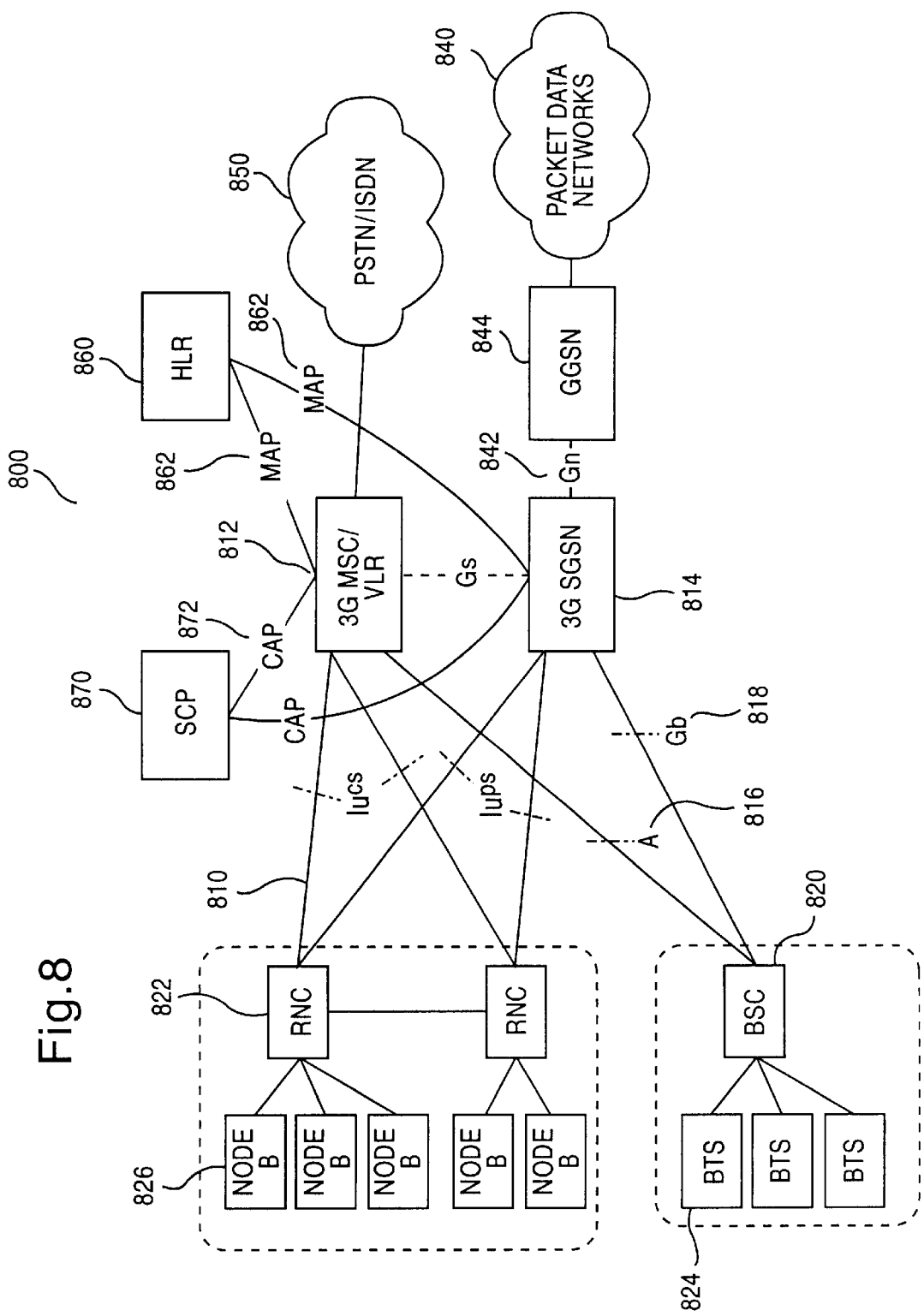
FIG. 8 illustrates the general UMTS architecture.

FIG. 8 illustrates the general UMTS architecture 800. In FIG. 8, the $I_u$ interface 810 terminates directly to GSM/UMTS core network elements 812, 814 without interworking over A 816 or $G_b$ 818 interfaces. The UMTS counterpart to the Base Station Controller (BSC) 820 is the Radio Network Controller (RNC) 822. The UMTS counterpart to the Base Transceiver Stations (BTS) 824 are Nodes 826.

The third generation Mobile Switching Center/Visitor Location Register (3G MSC/VLR) 812 and third generation Serving GPRS Support Node (3G SGSN) 814 represent the GSM/UMTS core network elements, which provide circuit switched and packet switched networks respectively. The logical separation between the 3G MSC/VLR 812 and 3G SGSN 814 provides backward compatibility with 2G GSM/GPRS, including both interworking with A and $G_b$ interfaces as well as handovers between UMTS and GSM. However, those skilled in the art will recognize that the 3G MSC/VLR 812 and 3G SGSN 814 may be implemented in the same physical network element.

Packet data networks 840 are coupled to the 3G SGSN via a $G_n$ interface 842 and Gateway GPRS Support Node (GGSN) 844. The PSTN/ISDN networks 850 are coupled to the 3G MSC/VLR 812. A Home Location Register (HLR) 860, via Mobility Application Protocol (MAP) 862 provides all the administrative information of each registered subscriber in the network, along with the current location of the subscriber. A Service Control Point (SCP) 870 provides access to the UMTS network for intelligent networks via a CAMEL Access Protocol (CAP) 872. Separate 3G MSC/VLR 812 and 3G SGSN 814 have their own independent mobility management functions. However, the packet side mobility management functions can be harmonized towards the GSM circuit side mobility management functions.

Figure 9:
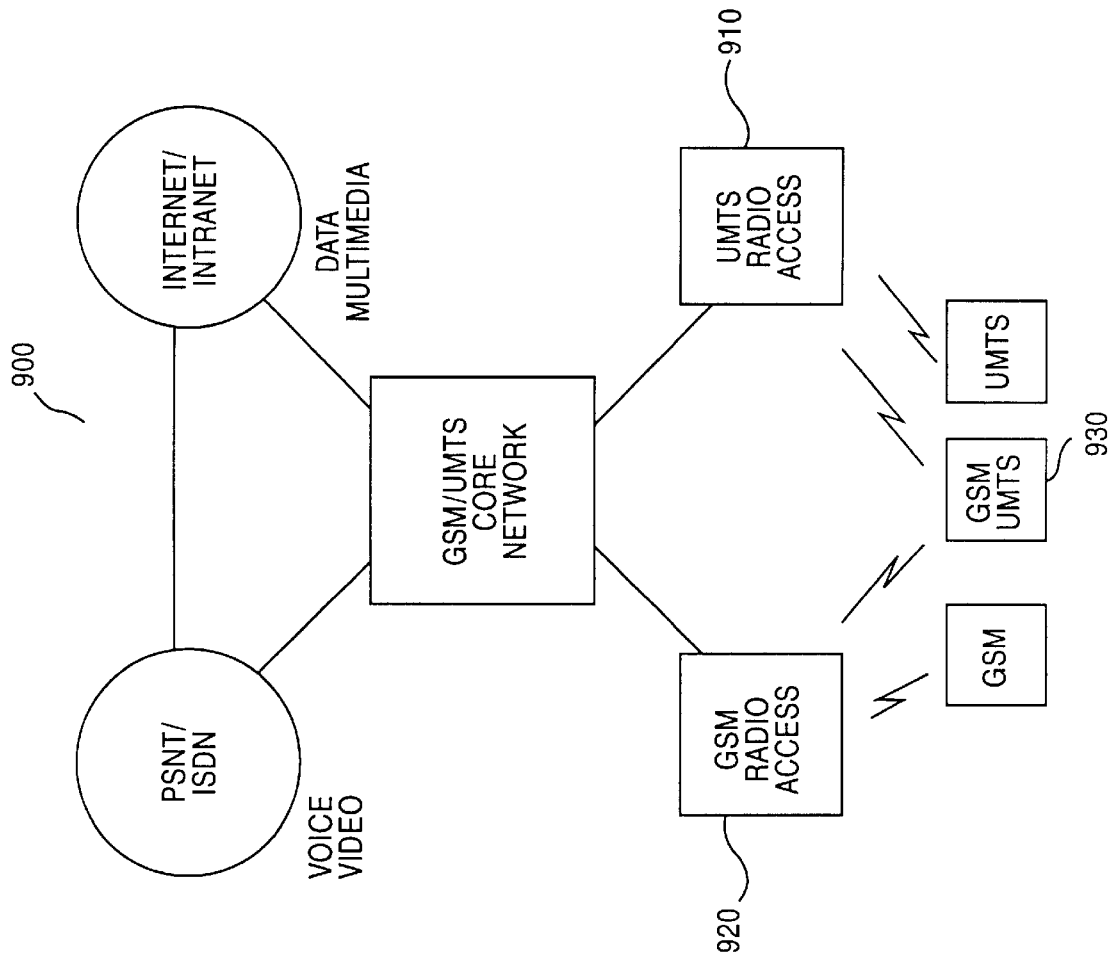
FIG. 9 illustrates a hybrid communication system wherein both UMTS and GSM access are provided.

FIG. 9 illustrates a hybrid communication system 900 wherein both UMTS 910 and GSM 920 access are provided. As shown in FIG. 9, a combination of two, or more, systems are one of the most likely concepts to realize the 3rd generation of mobile communications. For example, in Europe Digital Enhanced Cordless Telephone (DECT), GSM and ISDN have been identified as the focal points for the work on migration into the 3rd generation. However, those skilled in the art that the present invention is not meant to be limited to any particular type of wireless technology.

To maximize efficiency in hybrid communication systems as shown in FIG. 9, dual or multiple mode terminals 930 are necessary. With a dual mode terminal 930, the terminal may work in one mode at a particular time and then automatically change to a second mode. Further, dual mode terminals 930 with multiple subscriptions can be registered in both modes on different networks, although they can only be in active traffic in one mode at a time.

To provide mobility management for terminals with multiple subscriptions, the present invention provides a communication scheme which integrates UMTS Subscriber Identity Module (USIM) specific procedures into single procedures and uses a common TMSI. In the following discussion, it is assumed that there are multiple USIMs per terminal; with each USIM being uniquely identified by a USIM-ID; that each USIM is associated with one Service Provider, wherein the services provided to a USIM may be circuit switched or packet switched; and that each USIM has its own set of authentication parameters, wherein authentication is carried out separately for each USIM-ID.

FIG. 10 is a block diagram 1000 of a UMTS system performing a Location Area Update (LAU) according to the present invention. According to the present invention, a MS 1010 provides a list of USIM-IDs during a Location Area Update (LAU) using a single message in the form of a LAU REQ 1012 signal that includes each of the applicable USIM-IDs. The single LAU REQ 1012 contains the USIM-IDs listed in some order, e.g., USIM-ID1, USIM-ID2, USIM-ID3, etc.

FIG. 11 illustrates the listed USIM-IDs 1100 according to the present invention. In FIG. 11, the USIM-IDs 1110, 1112, 1114, 1116 are listed in ascending order. Further, each USIM indicated by the USIM-IDs 1110–1116 has its own set of authentication parameters. The network performs authentication separately for each USIM-ID 1110–1116. However, the authentication parameters are multiplexed into one message.

Referring again to FIG. 10, after the network sends 1014 the authentication parameters 1016 to the service providers 1018, the network 1014 waits for a specified period for all the service providers 1018 to provide information 1020 used in the authentication. After that, the network 1014 sends a Base TMSI assignment 1022 one "authentication request" 1024 to the MS 1012 containing authentication parameters for authentication of all the USIMs provided in the LAU REQ message 1012, in the same order as in the LAU REQ message 1012. If no answer from a service provider is received, or if authentication for a specific USIM is not required, a "dummy" element is set in the list. The "authentication response" 1024 contains responses to all the provided authentication parameters. The network 1014 then processes Update Location 1030 and Location Update Accept 1032 messages. The Location Update Accept message 1032 includes the list of USIMs that failed authentication, along with the failure reason. As shown in FIG. 12, the list can be coded as a bit string, where bit i is equal to 1 if USIM-IDi failed 1210, otherwise bit i is equal to 0 1220. If no USIM failed, there is no bit string.

The network assigns a Full TMSI that is equal to Location Are a Identity (LAI) added to the Base TMSI 1022. The LAI can be managed similarly to how LAIs are managed currently in GSM. The Base TMSI is conceptually like current GSM TMSI. The serving system 1014 then builds the Ordered list of registered USIM-IDs (OLRU) 1050. For example, if authentication succeeds for USIM-ID1 and USIM-ID3, but fails for USIM-ID2, the serving system 1014 builds an OLRU 1050 that includes USIM-ID1 and USIM-ID3. The serving system 1014 then binds the OLRU 1050 with the Full TMSI. USIM-ID2 is ignored. The MS 1010 performs the same OLRU 1060 building process.

Figure 13:
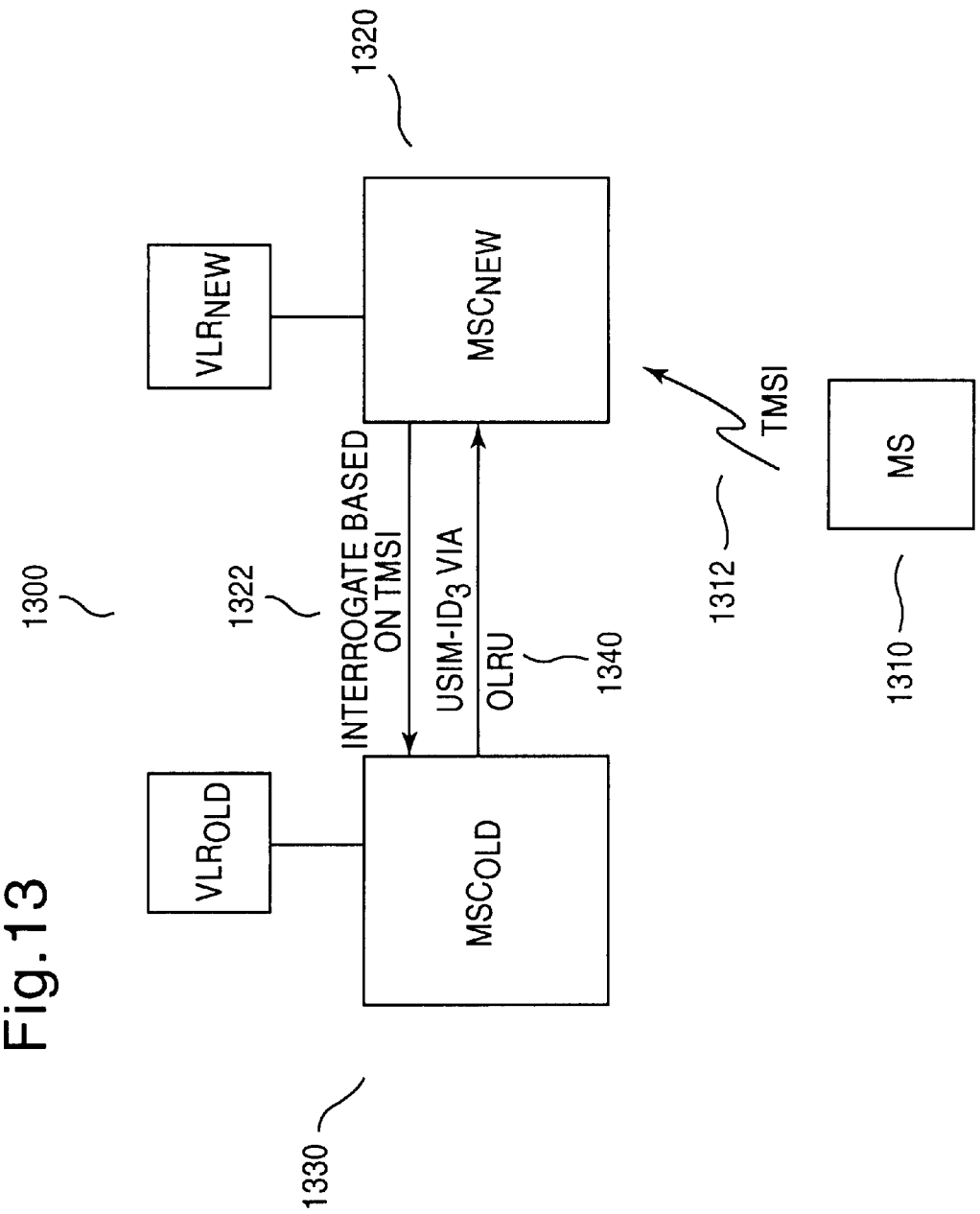
FIG. 13 illustrates a Location Area Update performed using TMSI.

Location Area Update can also be performed using TMSI. FIG. 13 illustrates a Location Area Update performed using TMSI 1300. In FIG. 13, the terminal 1310 provides the TMSI 1312 in LAU REQ, like in current GSM. The new serving MSC/VLR 1320 interrogates 1322 the old MSC/VLR 1330 to obtain the USIM-IDs. The old MSC/VLR 1330 then sends the OLRU 1340. In line with the assumption that authentication succeeds for USIM-ID1 and USIM-ID3, but fails for USIM-ID2, USIM-ID1 and USIM-ID3 are sent in that order. The new serving system 1320 binds TMSI with the OLRU. If a new TMSI is reallocated, the new TMSI is bound with the same OLRU.

Figure 14:
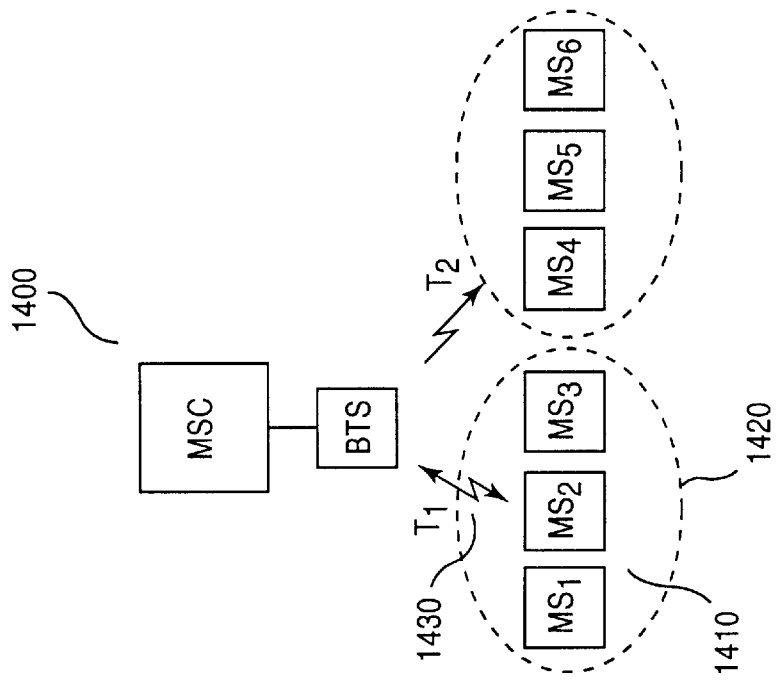
FIG. 14 illustrates a plurality of terminals that are assigned to paging groups.

As mentioned above with reference to FIG. 4, paging provides a means for sending a message to the mobile telephone to indicate that a call is to be received. In GSM, it is possible to partition terminals into paging groups. FIG. 14 illustrates a plurality of terminals that are assigned to paging groups 1400. For example, terminals 1410 belonging to a paging group 1 1420 has to listen for paging on the paging channel only during the fraction of time 1430 assigned to paging group 1 1420. The paging group is determined by using the last digits of the IMSI. However, with multiple USIMs, the scheme has to be extended. Thus, according to the present invention, the paging group is determined by combining the last digits of USIM-IDs in OLRU using sum modulo N. Nevertheless, the terminal has to listen to only one paging subchannel to properly process paging signals. The paging group 1420 is recalculated whenever the OLRU changes, or when the paging channel configuration changes.

Figure 15:
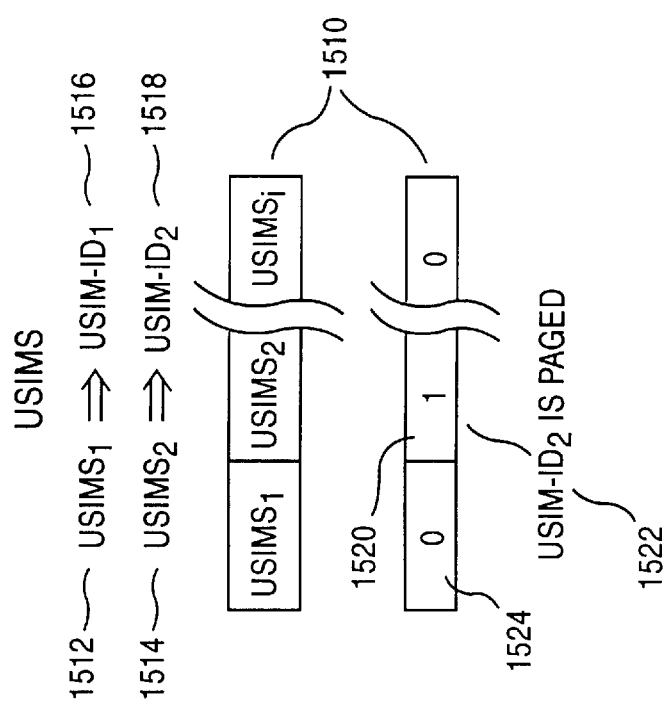
FIG. 15 illustrates the relationship of USIMS to USIM-ID.

Paging may also be performed using TMSI. The TMSI used in Paging Request is equal to the Base TMSI added to a USIM Specifier (USIMS). FIG. 15 illustrates the relationship of USIMS to USIM-ID 1500. As shown in FIG. 15, the USIMS is a string of bits 1510 associated with USIM-IDs. For example, Bit i of USIMS (denoted USIMSi) corresponds to the ith USIM-ID in the List of Registered USIM-ID (OLRU). Using the same assumption as described above, USIMS1 1512 and USIMS2 1514 correspond to USIM-ID1 1516 and USIM-ID2 1518 respectively. USIMSi is equal to 1 1520 if the corresponding USIM-ID is paged 1522, and USIMSi is equal to 0 1524 otherwise. This enables fast and flexible paging. The paging is fast because the USIM-ID is directly specified in the TMSI, and no further procedure is needed to determine the USIM-ID. It is flexible because simultaneous paging of multiple USIM-IDs is possible.

Bit mapping is compact and efficient in this case, since the number of USIMs in a terminal will likely be relatively small. Further, for added efficiency, USIMS does not have to be sent in Paging Request if the OLRU has only one USIM-ID. This also provides backwards compatibility with GSM and other second generation systems.

A procedure related to location updating is the IMSI attach and detach. A detach lets the network know that the mobile station is unreachable, and avoids having to needlessly allocate channels and send paging messages. An attach is similar to a location update, and informs the system that the mobile is reachable again. The activation of IMSI attach/detach is up to the operator on an individual cell basis.

If all USIM-IDs in the OLRU request to be IMSI attached, then TMSI is used without USIMs. Otherwise, IMSI attach would specify USIM-IDs to be attached by USIMS. USIMSi is equal to 1 if USIM-IDi requests to be attached. Otherwise, USIMSi is equal to 0. Authentication procedures for the USIM-IDs can be multiplexed, as for Location Area Update with USIM-IDs. An IMSI Attach for an USIM-ID not yet in the OLRU is handled as an USIM-ID Add, as described in more detail herein below.

If all USIM-IDs in OLRU wish to be detached, then TMSI is used without USIMS. Otherwise, IMSI detach would specify the specific USIM-ID to be detached using USIMS fields. USIMSi is equal to 1 if USIM-IDi requests a detach.

USIMs can be individually activated/deactivated on a dynamic basis. In that case, the MS can use USIM-ID Add (USIM-ID Delete) message to signal the addition (resp. deletion) of one or more USIM-IDs. USIM-ID Add lists the USIM-IDs to be added. This implicitly extends the OLRU. Consider the assumptions made above where USIM-ID1 and USIM-ID3 are in OLRU, if the MS wants to add a third and fourth USIM-ID, e.g., USIM-ID4 and USIM-ID5, the TMSI is bound with the USIM-IDs in the OLRU. For example, if registration succeeds only for USIM-ID5 and registration for USIM-ID4 fails authentication, the TMSI is now bound with an OLRU that consists of USIM-ID1, USIM-ID3 and USIM-ID5, in that order. This applies for both the serving system and the MS. For USIM-ID Delete, the list of USIM-IDs are modified similarly. For example, for the OLRU now including USIM-ID1, USIM-ID3 and USIM-ID5, if USIM-ID3 is deleted, the OLRU is updated to include USIM-ID1 and USIM-ID5 only.

When is a mismatch between the terminal OLRU and network OLRU is detected by the network, the network initiates recovery procedure by asking the terminal to do a Location Area Update (or Routing Area Update) with USIM-IDs. The OLRUs are then rebuilt at the terminal and network. When a mismatch is detected by the terminal, the terminal can initiate a Location Area Update (or Routing Area Update) with USIM-IDs.

Figure 16:
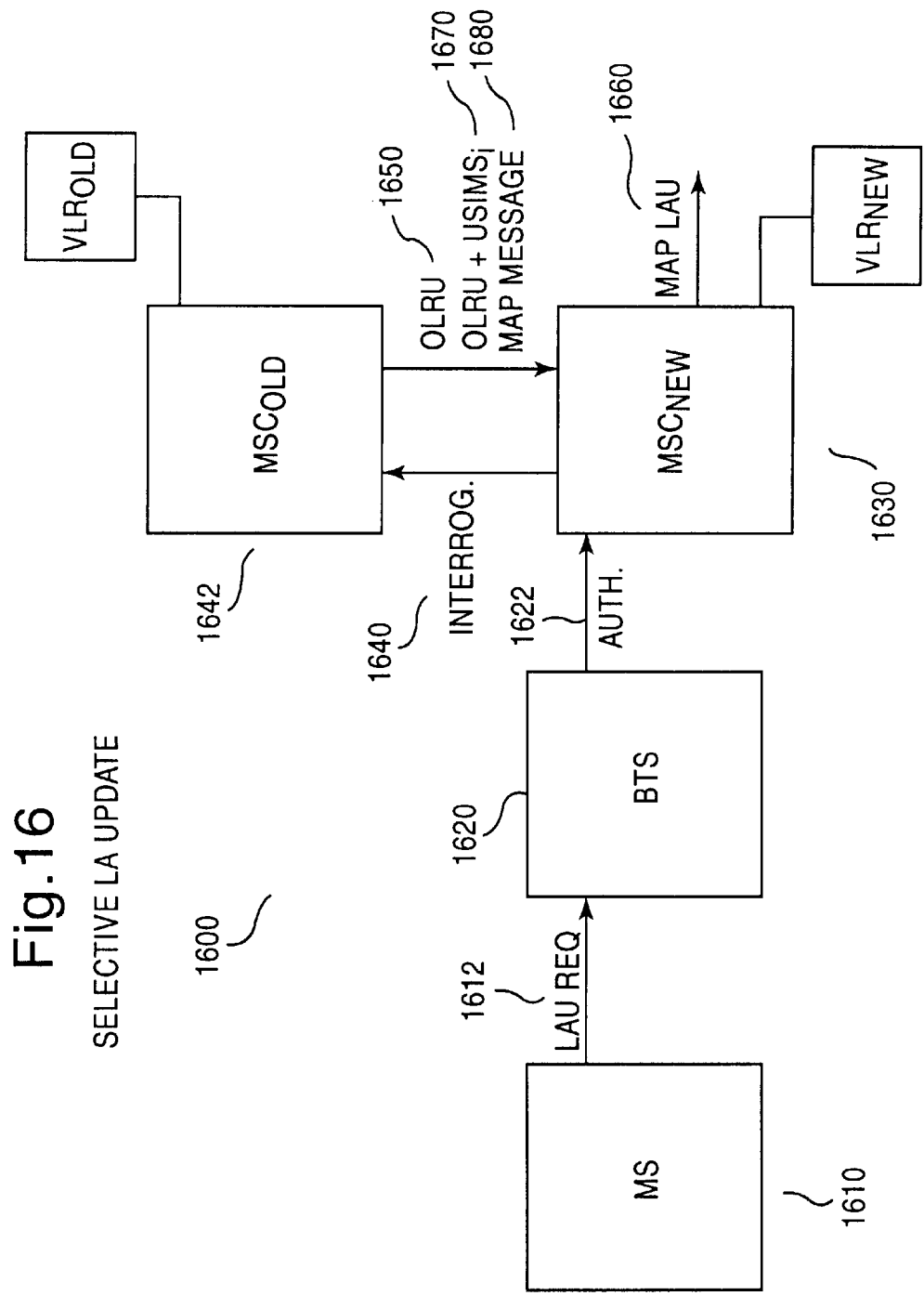
FIG. 16 illustrates the relevant parameters of a selective LA update process.

When an inter-MSC hard hand-off occurs, the invention allows one to have LA updates only for selected Attached USIMs. FIG. 16 illustrates a selective LA update process 1600. Selective LA updates may be needed to update location of those USIMs which don't currently have an active circuit connection (so a Mobile Terminated circuit call can be routed directly to the new MSC/VLR), while location update is inhibited for the USIMs which have an active circuit connection (to maintain continuity of control by the anchor MSC/VLR; these USIMs will be referred to as anchored USIMS).

To perform a selective LA update, the MS 1610 does a LAU REQ 1612 with a TMSI and USIMS. The BTS 1620 authenticates 1622 location with the new MSC/VLR 1630. The USIMS will specify which USIMs should have their location updated. Like before, the new MSC/VLR 1630 interrogates 1640 the old MSC/VLR 1642 to obtain the OLRU 1650. The new MSC/VLR 1630 will then initiate the MAP Location Update 1660 procedure for those USIMs which should have their location updated, according to the USIMS.

An alternative solution is that the terminal 1610 provides only the TMSI in LAU REQ 1612. The new serving MSC/VLR 1630 interrogates 1640 the old MSC/VLR 1642 to obtain the OLRU. In addition to sending the OLRU, the old MSC/VLR also indicates which USIMs which should have their location updated, by using a USIMS 1670. The new MSC/VLR 1630 then initiates the MAP Location Update 1660 procedure only for these USIMs.

When a USIM is no longer anchored (due to release of circuit connection), the MS 1610 does a location area update for that USIM by sending a LAU REQ 1612 with the TMSI and a USIMS that specifies the USIM in question. The new MSC/VLR 1630 updates the list of anchored USIMs and initiates a MAP Location Update 1660 procedure. An alternative is that the old MSC/VLR 1642 controlling the circuit connection that has just been released sends a MAP message 1680 to the new MSC/VLR 1630 to request a MAP Location Update 1660 procedure for the USIM.

In summary, according to the present invention, Location Area Update initially provides the list of USIM-IDs in a single request message. Since each USIM is authenticated separately, some USIMs may fail, while others may succeed authentication. The terminal and network each build their own Ordered List of Registered USIM-IDs (OLRU) which records the USIMs that succeeded. The network assigns a Base TMSI, like TMSI currently. Subsequent Location Area Update procedures use the Base TMSI, which is common to all USIMs in the OLRU. Thus it does not have to be repeated for each USIM. Paging Request uses the Base TMSI, along with a USIM Specifier (USIMS) field, which specifies which with USIM(s) is being paged. USIMS is kept very compact with bit string coding, which also gives flexibility to page multiple USIMs at the same time. The terminal and network interpret the bit string by using the OLRU. The terminal has to listen to only one paging subchannel. The paging subchannel is determined by calculating the sum modulo N of the last digits of the USIM-IDs in the OLRU. N is the number of possible subchannels. The scheme applies to UMTS as well as GSM/GPRS, if GSM/GPRS is enhanced to support multiple subscriptions per terminal. In the case of GPRS, Routing Area Update is used instead of Location Area Update, and TMSI may have a different format. Further, the present invention applies to IS-95/IS-41, IS-136/IS-41 systems, if they evolve to multiple subscriptions per terminal.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for managing mobile terminals having multiple subscriptions in a mobile environment, comprising:

allocating a Universal Mobile Telecommunications Standard (UMTS) subscriber identity module for each subscription associated with a mobile terminal, each UMTS subscriber identity module (USIM) being identified by an identification code (USIM-ID) and having a unique set of authentication parameters;

performing a single mobility management procedure for multiple subscriptions, the single mobility management procedure being initiated by providing a single message and including a location area update procedure, the location area update procedure providing a single location area update request message;

sending authentication parameters from a network to service providers;

analyzing the authentication parameters to determine valid subscriptions for each UMTS subscriber identity module;

providing authentication data from the service providers to the network, the authentication data being used by the network for authenticating each UMTS subscriber identity module; and sending a single authentication request to a mobile terminal, the single authentication request including authentication parameters for authentication of all UMTS subscriber identity modules identified by identification codes provided in the single location area update request message.

2. The method of claim 1 wherein the single location area update message comprises a list of identification codes for each UMTS subscriber identity module associated with the mobile terminal.

3. The method of claim 2 wherein the single location area update request message comprises USIM-IDs for subscriptions listed in sequential order.

4. The method of claim 1 wherein the single location area update request message is provided to the network for authentication, wherein the method further comprises separately authenticating by the network each subscription represented by the identification codes.

5. The method of claim 4 further comprising processing the step of building an ordered list of registered identification codes, the ordered list of registered identification codes representing authenticated identification codes.

6. The method of claim 5 wherein the mobile terminal builds the ordered list of registered identification codes representing authenticated identification codes.

7. The method of claim 5 wherein the network builds the ordered list of registered identification codes representing authenticated identification codes.

8. The method of claim 1 further comprising multiplexing the unique set of authentication parameters for each UMTS subscriber identity module into a single message.

9. The method of claim 1 further comprising waiting a predetermined time before sending a single authentication request to the mobile terminal.

10. The method of claim 9 further comprising inserting an indication in the single authentication request representing UMTS subscriber identity modules for which authentication is not requested.

11. The method of claim 10 wherein the indication is inserted when the service provider fails to provide authentication data for an UMTS subscriber identity module within a predetermined time period.

12. The method of claim 1 further comprising assigning a full Temporary Mobile Subscriber Identity (TMSI) to the mobile terminal, the full TMSI being equal to a location area identity and a Base TMSI.

13. The method of claim 12 further comprising building an ordered list of registered identification codes representing UMTS subscriber identity modules indicated by the location update accept message as having been successfully authenticated.

14. The method of claim 13 wherein the mobile terminal builds the ordered list of registered identification codes representing authenticated identification codes.

15. The method of claim 13 wherein the network builds the ordered list of registered identification codes representing authenticated identification codes.

16. The method of claim 1 wherein a location update accept message is provided in response to the location update request message, the location update accept message including an indication of UMTS subscriber identity modules that failed authentication.

17. The method of claim 16 wherein the location update accept message comprises a bit string, wherein each bit in the bit string is set to a first value to indicate the authentication failure of an UMTS subscriber identity module and to a second value to indicate successful authentication of an UMTS subscriber identity module.

18. The method of claim 1 wherein the single location area update request message comprises a temporary mobile subscriber identity, and the method further comprising obtaining at a mobile switching center currently handling the mobile terminal an ordered list of registered identification codes from a mobile switching center previously handling the mobile terminal, the ordered list of registered identification codes representing authenticated UMTS subscriber identity modules and binding the temporary mobile subscriber identity with the ordered list of registered identification codes.

19. The method of claim 1 further comprising reallocating a new temporary mobile subscriber identity to the mobile terminal and binding the new temporary mobile subscriber identity to an ordered list of registered identification codes.

20. The method of claim 1 wherein the single location area update request message further comprises a list of identification codes for each UMTS subscriber identity module associated with the mobile terminal and is provided to the network for authentication, the method further comprising separately authenticating by the network a subscription represented by each identification codes listed in the single location area update request message and building an ordered list of registered identification codes based on the authentication of each subscription represented by the identification codes, the ordered list of registered identification codes representing authenticated identification codes.

21. The method of claim 20 wherein the single location area update request message comprises identification codes for subscriptions listed in sequential order.

22. The method of claim 1 wherein the single mobility management procedure comprises a paging procedure, the paging procedure comprising sending a page message to a mobile terminal for indicating a call for the mobile terminal is being received.

23. The method of claim 22 wherein the mobile terminal is associated with a paging group, the paging group allowing the mobile terminal to listen for paging only on the paging channel during a predetermined time slice assigned to the paging group.

24. The method of claim 23 further comprising combining a group of digits at an end of the identification codes in the ordered list of registered identification codes.

25. The method of claim 24 wherein the combining further comprises using sum modulo N.

26. The method of claim 24 further comprising recalculating the paging group when the ordered list of registered identification codes changes.

27. The method of claim 24 further comprising recalculating the paging group when a configuration for the paging channel changes.

28. The method of claim 23 further comprising performing paging using a temporary mobile subscriber identity, the temporary mobile subscriber identity being equal to a Base temporary mobile subscriber identity having an UMTS subscriber identity module specifier appended thereto.

29. The method of claim 28 wherein the UMTS subscriber identity module specifier comprises a string of bits associated with the identification codes.

30. The method of claim 29 wherein each bit in the UMTS subscriber identity module specifier corresponds to the identification codes in the ordered list of registered identification codes.

31. The method of claim 30 further comprising setting a bit to a first value when a corresponding identification code is being paged.

32. The method of claim 30 further comprising setting a bit to a second value when a corresponding identification code is not being paged.

33. The method of claim 32 wherein the UMTS subscriber identity module specifier fully identifies the identification code being paged and allows simultaneous paging of multiple identification codes.

34. The method of claim 30 wherein the UMTS subscriber identity module specifier is not sent when the ordered list of registered identification codes comprises a single identification code.

35. The method of claim 34 wherein the connotation comprises a list of identification codes.

36. The method of claim 34 wherein the connotation comprises a temporary mobile subscriber identity including a UMTS subscriber identity module specifier, each bit in the UMTS subscriber identity module specifier being set to a first value if the corresponding identification code is responding to the page.

37. The method of claim 29 further comprising providing a connotation by the mobile terminal of identification codes responding to the page.

38. The method of claim 1 wherein the single mobility management procedure comprises performing international mobile subscriber identity (IMSI) attach of identification codes in an ordered list of registered identification codes.

39. The method of claim 38 wherein identification codes and UMTS subscriber identity module specifiers are used to attach identification codes, wherein each bit in an UMTS subscriber identity module specifier is set to a first value when the corresponding identification code is to be attached and to a second value when an identification code associated with the corresponding identification code is not to be attached.

40. The method of claim 39 wherein the UMTS subscriber identity module specifier is not sent when all identification codes in the ordered list of registered identification codes are to be attached.

41. The method of claim 1 wherein the single mobility management procedure comprises performing General Packet Radio Service (GPRS) attach of identification codes in an ordered list of registered identification codes.

42. The method of claim 41 wherein identification codes and UMTS subscriber identity module specifiers are used to attach identification codes, wherein each bit in an UMTS subscriber identity module specifier is set to a first value when the corresponding identification code is to be attached and to a second value when an identification code associated with the corresponding identification code is not to be attached.

43. The method of claim 42 wherein the UMTS subscriber identity module specifier is not sent when all identification codes in the ordered list of registered identification codes are to be attached.

44. The method of claim 1 wherein the single mobility management procedure comprises performing international mobile subscriber identity (IMSI) detach of identification codes in an ordered list of registered identification codes.

45. The method of claim 44 wherein the UMTS subscriber identity module is not sent when all identification codes in the ordered list of registered identification codes are to be detached.

46. The method of claim 45 wherein UMTS subscriber identity module specifiers are used to detach identification codes, wherein each bit in an UMTS subscriber identity module specifier is set to a first value when a corresponding identification code is to be detached and to a second value when a corresponding identification code is not to be detached.

47. The method of claim 1 wherein the single mobility management procedure comprises performing General Packet Radio Service (GPRS) detach of the identification codes in an ordered list of registered identification codes.

48. The method of claim 47 wherein the UMTS subscriber identity module is not sent when all identification codes in the ordered list of registered identification codes are to be detached.

49. The method of claim 48 wherein UMTS subscriber identity module specifiers are used to detach identification codes, wherein each bit in an UMTS subscriber identity module specifier is set to a first value when a corresponding identification code is to be detached and to a second value when a corresponding identification code is not to be detached.

50. The method of claim 1 wherein the single mobility management procedure comprises performing an identification code add procedure for adding an identification code not in an ordered list of registered identification codes and updating the ordered list of registered identification codes in response thereto.

51. The method of claim 1 wherein the single mobility management procedure comprises performing an identification code delete procedure for deleting an identification code in an ordered list of registered identification codes and updating the ordered list of registered identification codes in response thereto.

52. The method of claim 1 further comprising performing a selective location area update by causing the mobile terminal to issue a location area update request with a temporary mobile subscriber identity and UMTS subscriber identity module specifier, wherein the UMTS subscriber identity module specifier indicates which UMTS subscriber identity module need updating.

53. The method of claim 52 further comprising interrogating a mobile switching center and visitor location register previously handling a mobile terminal by a mobile switching center and visitor location register currently handling the mobile terminal to obtain an old ordered list of registered identification codes from the mobile switching center and visitor location register previously handling a mobile terminal and initiating by the mobile switching center and visitor location register currently handling the mobile terminal a mobile application part (MAP) location update procedure for UMTS subscriber identity modules indicated by the UMTS subscriber identity module specifier as needing a location update.

54. The method of claim 1 further comprising initiating the performing of the location area update when an ordered list of registered identification codes of the mobile terminal do not match a network ordered list of registered identification codes.

55. The method of claim 1 further comprising performing a selective location area update by causing the mobile terminal to issue a location area update request with a temporary mobile subscriber identity.

56. The method of claim 55 further comprising interrogating a mobile switching center and visitor location register previously handling a mobile terminal by a mobile switching center and visitor location register currently handling the mobile terminal to obtain an old ordered list of registered identification codes and UMTS subscriber identity module specifier from the mobile switching center and visitor location register previously handling a mobile terminal, wherein the UMTS subscriber identity module specifier indicates which UMTS subscriber identity module need updating and initiating by the mobile switching center and visitor location register currently handling the mobile terminal a mobile application part (MAP) location update procedure for UMTS subscriber identity module indicated by the UMTS subscriber identity module specifiers as needing a location update.

57. A mobile terminal having multiple subscriptions comprising a controller for providing mobility management, the controller allocating a Universal Mobile Telecommunications Standard (UMTS) subscriber identity module for each subscription associated with a mobile terminal, and performing a single mobility management procedure for multiple subscriptions, the single mobility management procedure being initiated by a single message, including a location area update procedure, the location area update procedure providing a single location area update request message, the single location area update request message includes a temporary mobile subscriber identity, and the controller obtaining at a mobile switching center currently handling the mobile terminal an ordered list of registered identification codes from a mobile switching center previously handling the mobile terminal, the ordered list of registered identification codes representing authenticated UMTS subscriber identity modules, wherein the temporary mobile subscriber identity is bound with the ordered list of registered identification codes and received by the controller.

58. The mobile terminal of claim 57 wherein each UMTS subscriber identity module is identified by a identification code, the single location area update request message comprising a list of identification codes for each UMTS subscriber identity module associated with the mobile terminal.

59. The mobile terminal of claim 58 wherein the single location area update request message is provided to the network for authentication, wherein the method further comprises separately authenticating by the network each subscription represented by the identification codes.

60. The mobile terminal of claim 58 wherein the single location area update request message comprises identification codes for subscription listed in sequential order.

61. The mobile terminal of claim 58 wherein the controller further builds an ordered list of registered identification codes, the ordered list of registered identification codes representing authenticated identification codes.

* * * * *